US009528731B2

(12) United States Patent
Khaliq et al.

(10) Patent No.: US 9,528,731 B2
(45) Date of Patent: Dec. 27, 2016

(54) SOLAR POWERED COOLING SYSTEM

(71) Applicant: King Fahd University of Petroleum and Minerals, Dhahran (SA)

(72) Inventors: Abdul Khaliq, Dhahran (SA); Esmail Mohamed Ali Mokheimer, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 134 days.

(21) Appl. No.: 14/694,655

(22) Filed: Apr. 23, 2015

(65) Prior Publication Data

US 2016/0313032 A1    Oct. 27, 2016

(51) Int. Cl.
*F25B 27/00*    (2006.01)
*F25B 49/02*    (2006.01)

(52) U.S. Cl.
CPC ............. *F25B 27/005* (2013.01); *F25B 49/02* (2013.01)

(58) Field of Classification Search
CPC ....... F25B 27/005; F25B 49/02; F25B 15/006; F25B 15/008; F25B 11/02; F25B 1/06; F25B 27/002; F25B 2700/002; F25B 2700/005; F24F 5/00; F24F 5/0046
USPC ........................................................ 62/235.1
See application file for complete search history.

(56) References Cited

U.S. PATENT DOCUMENTS

| 4,028,078 | A | * | 6/1977 | Peckham | ............... | F25B 15/006 |
| | | | | | | 209/143 |
| 4,251,997 | A | * | 2/1981 | Newton | ................... | F25B 15/00 |
| | | | | | | 62/101 |
| 6,158,237 | A | * | 12/2000 | Riffat | ..................... | B01D 3/007 |
| | | | | | | 165/92 |
| 8,943,844 | B2 | * | 2/2015 | Forkosh | ............... | B01D 53/263 |
| | | | | | | 62/143 |
| 2005/0076639 | A1 | * | 4/2005 | Shirk | ...................... | F01K 25/08 |
| | | | | | | 60/520 |

(Continued)

FOREIGN PATENT DOCUMENTS

| CN | 1611868 A | 5/2005 |
| CN | 2867184 Y | 2/2007 |

(Continued)

*Primary Examiner* — Mohammad M Ali

(74) *Attorney, Agent, or Firm* — Oblon, McClelland, Maier & Neustadt, L.L.P.

(57) ABSTRACT

A solar powered cooling system that obtains a plurality of cooling temperatures in a simultaneous fashion. The system includes a heliostat field, a steam-Rankine cycle (SRC), absorption-refrigeration cycle (ARC), an ejector-refrigeration cycle (ERC) and a cascaded-refrigeration cycle (CRC). The heliostat field directs solar energy to a receiver included in the SRC to heat molten-salt. The heated molten salt transfers heat energy to form vapors of a first refrigerant. A steam turbine transfer the power to drive the vapor compression system (CRC) system and vapor at the turbine exit is fed to the ERC cooling system. The ERC achieves a first cooling temperature range by driving an ejector-nozzle by the vapors of the first refrigerant. The steam turbine drives a first compressor and a second compressor included in the CRC to obtain a second cooling temperature range. A condenser included in the ARC portion condenses the vapors of the first refrigerant to obtain a third cooling temperature range.

18 Claims, 5 Drawing Sheets

(56) References Cited

U.S. PATENT DOCUMENTS

| | | | | |
|---|---|---|---|---|
| 2005/0188718 A1* | 9/2005 | Suzuki | ............... | F25B 30/02 |
| | | | | 62/434 |
| 2007/0000262 A1* | 1/2007 | Ikegami | ............... | F25B 41/00 |
| | | | | 62/170 |
| 2009/0032215 A1* | 2/2009 | Muscatell | ............ | F24F 5/0046 |
| | | | | 165/45 |
| 2010/0287978 A1* | 11/2010 | Moreland | ............ | F25B 15/10 |
| | | | | 62/490 |
| 2012/0023982 A1* | 2/2012 | Berson | ............... | F24F 5/0046 |
| | | | | 62/115 |
| 2012/0116594 A1* | 5/2012 | Aidoun | ............... | F25B 1/06 |
| | | | | 700/276 |

FOREIGN PATENT DOCUMENTS

| | | |
|---|---|---|
| IN | 1015/DEL/2011 | 4/2011 |
| JP | 2014-25653 | 2/2014 |

* cited by examiner

SOLAR POWERED COOLING SYSTEM

BACKGROUND

Field of Disclosure

Embodiments described herein generally relate to a solar powered cooling system that can produce a wide range of cooling temperatures in a single thermodynamic cycle.

Description of the Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Solar powered cooling systems are a viable technology to exploit the abundant solar energy in order to provision the increasing demands for air-conditioning and refrigeration. Specifically, in countries with high temperatures during the peak summer months, the solar energy can be used to provide efficient cooling and refrigeration requirements and thus reduce the power consumption that is used to provide cooling. For instance, in the gulf countries, approximately 50% of the produced power is allocated to be used for cooling and refrigeration systems.

Research and developmental activities in the area of thermal power generation are based on concentrating solar power (CSP) systems. Such CSP systems are deployed in grid connected plants and are best suited for utility-scale applications that generate up to 400 mega-watts of power. Such CSP systems are typically, single-cycle thermodynamic systems that provide only one range of cooling temperatures. For instance, the solar driven ejector-absorption refrigeration cycle provides cooling only in the range from −23° C. to 17° C. and is thus suitable only for refrigeration purposes.

However, many industrial applications require a wide range of cooling temperatures to be achieved simultaneously by a single thermodynamic system. For instance, applications such as vaccine preservation, production of dry-ice in pharmaceutical applications, etc. require cooling in the range from −50° C. to −80° C. The use of a dedicated CSP system for each cooling application having a different cooling temperature range is not a cost-effective solution. Accordingly, there is a requirement for a single thermodynamic system that can produce different cooling temperature ranges to address the cooling requirements of different applications.

SUMMARY

The present disclosure describes a single multi-mode thermodynamic cycle for a solar powered cooling system that produces cooling temperatures of different ranges in a simultaneous fashion. Specifically, the thermodynamic cycle can meet the cooling requirements for air-conditioning applications, which require cooling temperatures in the range from 10° C. to 18° C., refrigeration for food preservation applications, which require cooling temperatures in the range from 0° C. to 5° C., and deep freezing for vaccine preservation applications, which require cooling temperatures in the range from −50° C. to −80° C. The cooling system, referred to herein as a triple effect cooling system achieves the different cooling temperature ranges simultaneously in a single thermodynamic cycle.

According to an embodiment, the solar powered cooling system integrates a heliostat field and a central receiver that is included in a steam-Ranke-cycle (SRC) of the cooling system. Further, the cooling system integrates an ejector-refrigeration-cycle (ERC), absorption-refrigeration-cycle (ARC), and cascaded-refrigeration-cycle (CRC) with the heliostat field and SRC.

Embodiments described herein use water ($H_2O$) that has a zero ozone depletion potential (ODP) and a zero global warming potential (GWP), as a working fluid for SRC for power generation, and as a refrigerant for the ERC and ARC cycles for producing the desired cooling, respectively. The cooling system uses nitrous oxide ($N_2O$) that has zero ODP and a moderate GWP as a second refrigerant in the CRC cycle portion of the system to produce cooling temperatures in the deep freezing ranges.

Accordingly, one embodiment of the present disclosure provides for a method of simultaneously obtaining a plurality of cooling-temperature ranges by a solar powered cooling system. The method includes: directing, by a heliostat field, solar energy to a receiver included in a first portion of the cooling system, the receiver heating molten-salt that flows in the first portion of the cooling system; transferring heat energy from the heated molten salt to a first refrigerant, in a first generator and a second generator, the transferred heat energy forming vapors of the first refrigerant; distributing, by a steam turbine, vapors of the first refrigerant obtained by the first generator, to drive a second portion and a third portion of the cooling system; driving an ejector nozzle included in the second portion of the cooling system by the vapors of the first refrigerant to obtain a first cooling temperature range; compressing a second refrigerant, by a first compressor and a second compressor included in a third portion of the cooling system to obtain a second cooling temperature range; and condensing, by a condenser included in a fourth portion of the cooling system, vapors of the first refrigerant obtained by the second generator, to obtain a third cooling temperature range.

According to one embodiment is provided a solar powered cooling system that includes: a heliostat field configured to direct received solar energy to a receiver included in a first portion of the cooling system, the receiver heating molten-salt that flows in the first portion of the cooling system; a first steam-generator and a second steam generator configured to form vapors of a first refrigerant by transferring heat energy from the molten-salt to the first refrigerant; a steam turbine configured to distribute vapors of the first refrigerant obtained by the first steam-generator, to drive a second portion and a third portion of the cooling system; an ejector nozzle included in the second portion of the cooling system, and driven by vapors of the first refrigerant, being configured to obtain a first cooling-temperature range; a first compressor and a second compressor included in a third portion of the cooling system and configured to compress a second refrigerant to obtain a second cooling-temperature range; and a condenser included in a fourth portion of the cooling system and configured to condense vapors of the first refrigerant obtained by the second generator, to obtain a third cooling temperature range.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
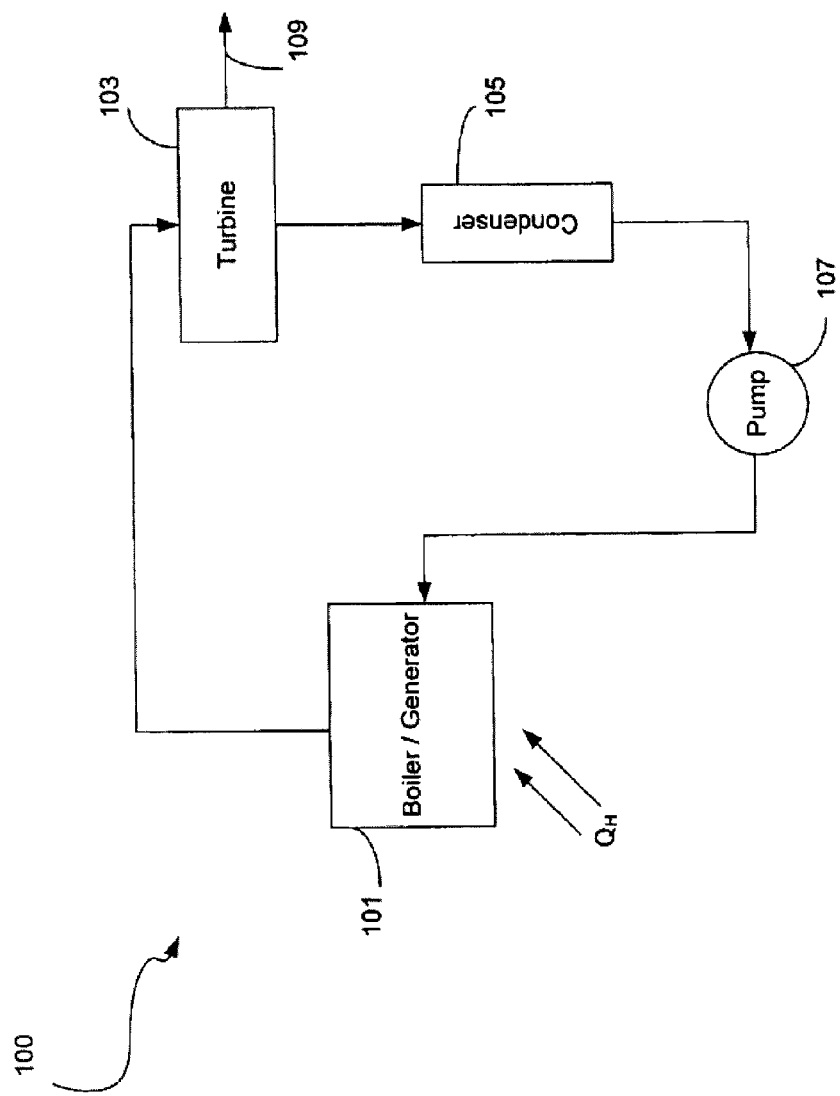
FIG. 1 illustrates an exemplary Rankine cycle.

FIG. 1 illustrates a Rankine cycle 100 according to one embodiment of the present disclosure. A Rankine cycle is an operating cycle of a thermodynamic system where an operating fluid is continuously evaporated and condensed. The selection of the operating fluid is dependent on the desired temperature range.

The Rankine cycle 100 includes a boiler or generator 101, a turbine 103, a condenser 105 and a pump 107. The Rankine cycle operates as follows: high pressure liquid enters the boiler 101 from the feed pump 107 and is heated (by a heat source represented as $Q_H$) to its saturation temperature. The addition of heat energy causes evaporation of the liquid until it is fully converted to saturated steam.

The vapor (steam) is expanded in the turbine 103, thus producing work 109 which may be converted, for instance, to electricity. Note that the expansion of steam is limited by the temperature of the cooling medium and by the erosion of the turbine blades by liquid entrainment in the vapor stream. The vapor-liquid mixture leaving the turbine 103 is condensed at low pressure, in surface condenser 105 using cooling water. In the condenser, the pressure of the vapor is well below atmospheric pressure, approaching the saturation pressure of the operating fluid at the cooling water temperature. The pressure of the condensate is raised in the feed pump 107. The condensate (operational fluid) entering the pump is fed back to the boiler 101 to complete the thermodynamic cycle. Thus, in this manner, the operating fluid is continuously cycled (evaporated and condensed) through the system. According to one embodiment of the present disclosure, water ($H_2O$) is used as an eco-friendly working fluid in the Ranking cycle.

Figure 2A:
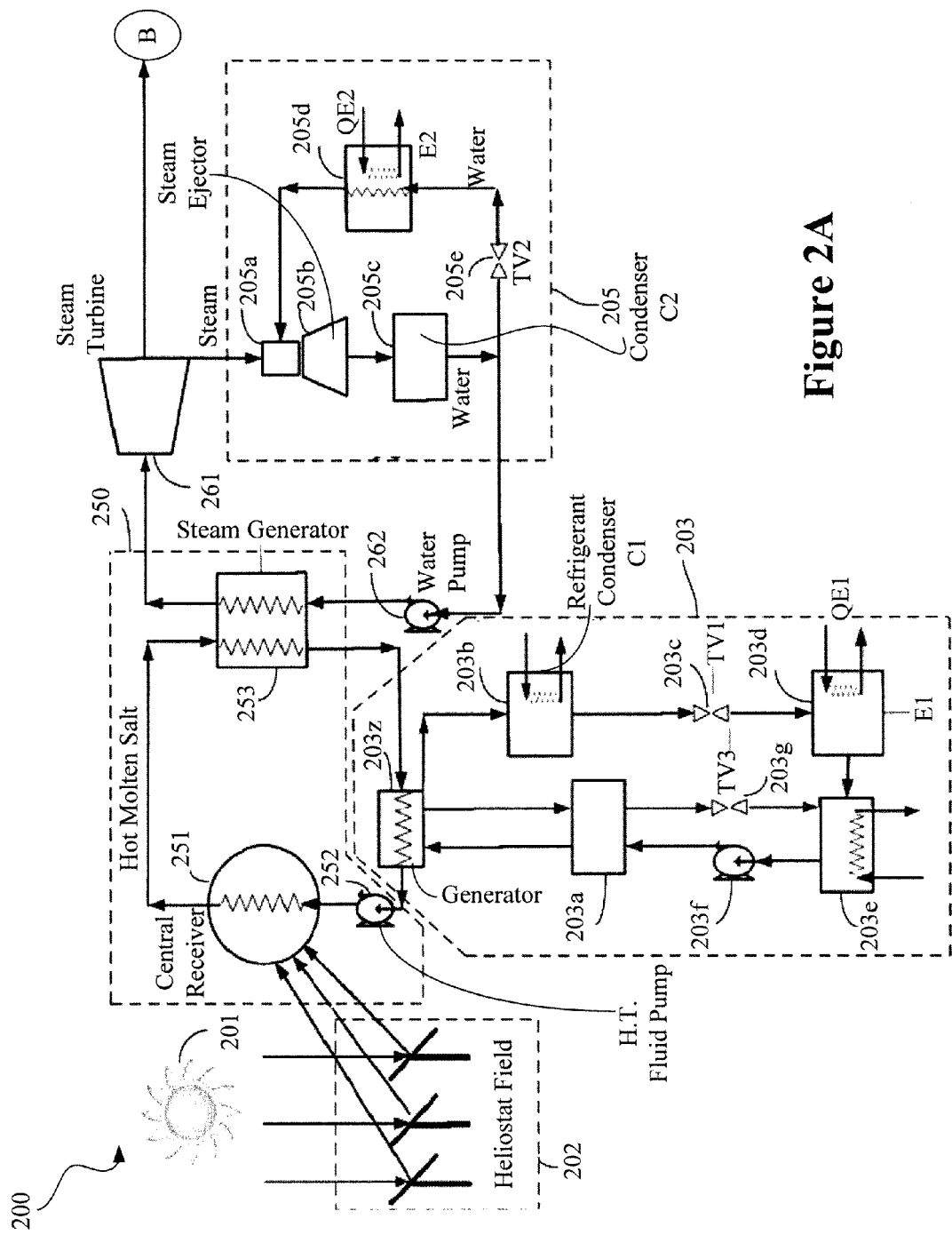
FIGS. 2A and 2B illustrate according to one embodiment a multi-mode cooling system.
Figure 2B:
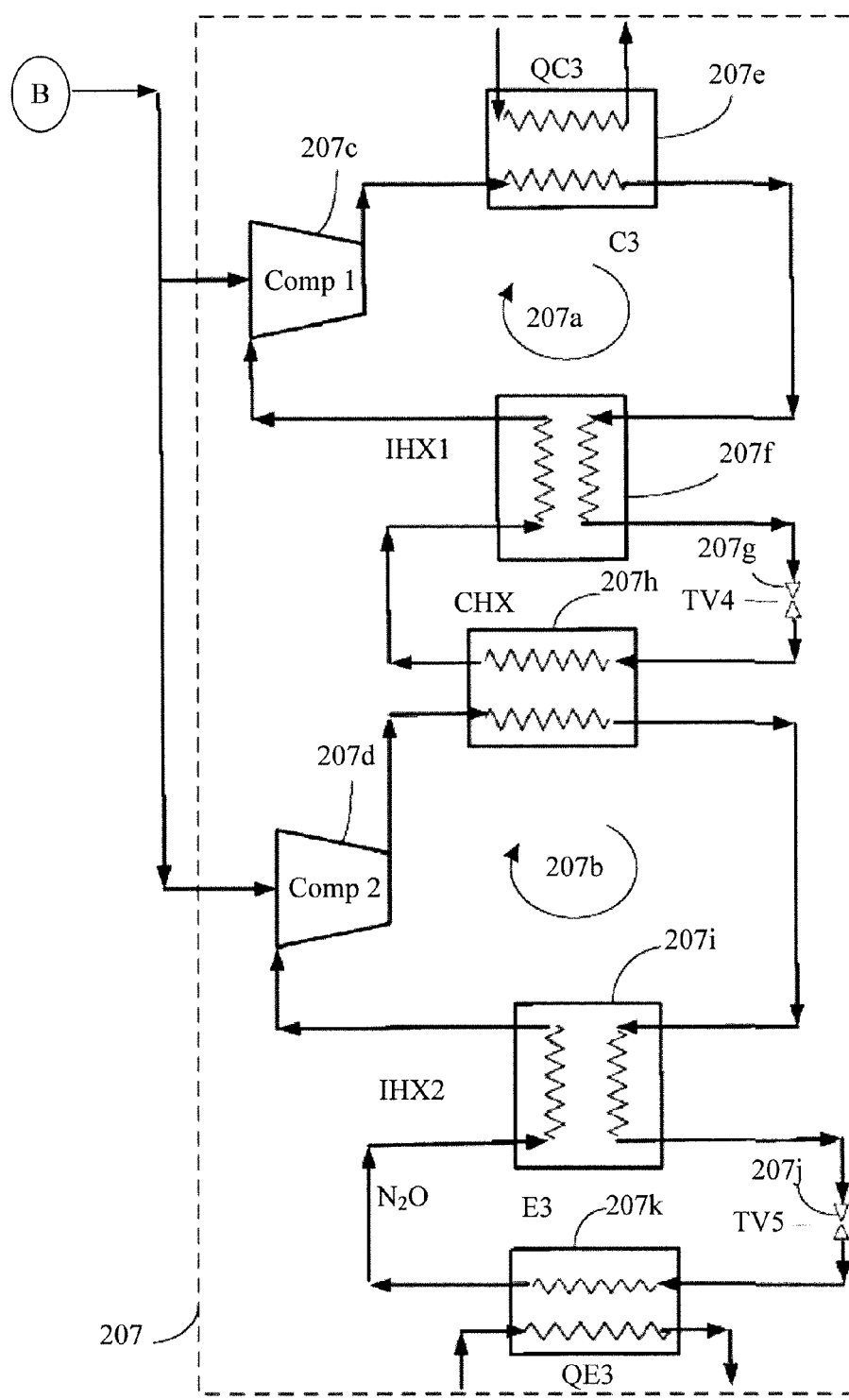

FIGS. 2A and 2B illustrate according to one embodiment a multi-mode thermodynamic system (also referred to herein as a solar powered cooling system) 200. According to one embodiment, the cooling system 200 of FIG. 2A, integrates a heliostat field 202, a steam Rankine cycle (SRC) 250, an absorption refrigeration cycle (ARC) 203, an ejector refrigeration cycle (ERC) 205 and a cascaded refrigeration cycle (CRC) 207. According to an embodiment, water that has zero ozone depletion potential (ODP) and a zero global warming potential (GWP) is used as a refrigerant in the SRC, ERC, and ARC portions of the cooling system 200, while nitrous oxide which has zero ODP and a moderate GWP is used as a refrigerant in the CRC portion of the cooling system.

The ODP of a chemical compound is the relative amount of degradation caused by the compound to the ozone layer, with the compound Trichlorofluoromethane (R-11 or CFC-11) having an ODP of 1.0. GWP is a relative measure of how much heat a greenhouse gas traps in the atmosphere. GWP compares the amount of heat trapped by a certain mass of the gas in question to the amount of heat trapped by a similar mass of carbon dioxide. A GWP is calculated over a specific time interval, commonly 20, 100 or 500 years. GWP is expressed as a factor of carbon dioxide (whose GWP is standardized to 1). For instance, the 20 year GWP of methane is 86, which means that if the same mass of methane and carbon dioxide were introduced into the atmosphere, that methane will trap 86 times more heat than the carbon dioxide over the next 20 years. Furthermore, the GWP of R-134a that has been commonly used for refrigeration purposes, has a very high GWP (around 1300). Thus, there is a requirement for a refrigerant having little or zero GWP.

Turning now to FIG. 2A, the heliostat field 202 includes a plurality of mirrors that are configured to turn the reflective surfaces of the mirrors in a manner such that the mirrors continuously direct the received sunlight (from sun 201) to a fixed receiver 251. According to an embodiment, each mirror included in the heliostat may be mounted on an altazimuth or alt-azimuth mount. An alt-azimuth mount is a two-axis mount for supporting and rotating an instrument about two mutually perpendicular axes: one vertical and the other horizontal. Rotation about the vertical axis varies the azimuth of the pointing direction of the instrument (mirror). Rotation about the horizontal axis varies the altitude (angle of elevation) of the pointing direction. In what follows, the overall working of the cooling system is exemplified by describing the operation of the ARC, ERC and the CRC refrigeration cycles.

Upon receiving solar energy, the heliostat field reflects the solar energy to a central receiver 251. According to one embodiment, the central receiver 251 may be disposed on the top of a tower of the cooling system. The concentrated rays that fall onto the receiver 251 increase the temperature in the surrounding of the receiver. The increase in temperature is used to heat molten salt that flows through the pipes embedded inside the receiver. Molten salt is used as a heat transfer fluid to transfer heat to the refrigerant in the SRC, 250. The heated molten salt passes through a steam generator 253 and transfers thermal energy to water that flows through the steam generator 253 in a counter flow mode. According to an embodiment, the molten salt used in the solar powered cooling system may be a fluoride based molten salt such as lithium fluoride (LiF), a chloride based molten salt such as sodium chloride (NaCl), a fluoroborate based molten salt such as sodium tetra-fluoroborate ($NaBF_4$) or the like. Furthermore, the molten salt may be formed by a mixture of NaCl and KCl, preferably 40-80% NaCl and 20-60% KCl, more preferably 50-70% NaCl and 30-50% KCl, or 55-65% NaCl and 35-45% KCl, or 60% NaCl and 40% KCl (where % is wt % based on the total weight of the NaCl and the KCl), lithium fluoride and Beryllium fluoride (LiF—$BeF_2$), a mixture of LiF—NaF—KF, KCl—$MgCl_2$ or the like. According to one embodiment, the cooling system may employ a specific mixture of NaCl and KCl to obtain a specific temperature within a certain cooling range.

Upon receiving thermal energy from the molten salt, the water is heated from sub-cooled liquid to super-heated steam in the steam generator 253. The steam produced in the steam generator 253 is transferred to a steam turbine 261 that uses the steam to drive the CRC and the ERC refrigeration cycles of the cooling system 200. The molten salt is circulated through a generator 203z, which is included in the ARC portion of the cooling system 200 and is eventually pumped back to the central receiver 251 via a pump 252.

The ARC portion 203 of the cooling system 200 includes a generator 203z, a solution heat exchanger (SHX) 203a, a condenser 203b, an evaporator 203d, an absorber 203e, a pump 203f, and a pair of throttling valves (TV1 and TV3) represented as 203c and 203g, respectively. The heated molten salt that passes through the generator 203z heats the water circulating through the generator. According to one embodiment, water is used as a refrigerant in the ARC. Superheated water vapor from the generator is cooled in the condenser 203b. Further, high pressure liquid refrigerant from the condenser 203b passes into the evaporator 203d through an expansion throttling valve (TV1) 203c. The valve 203c reduces the pressure of the refrigerant that enters the evaporator 203d. In the evaporator 203d, the refrigerant vaporizes by absorbing heat from the material that the ARC intends on cooling.

The resulting low-pressure vapor passes through an absorber 203e, where the vapor is absorbed by a strong solution that flows in from the generator 203z via a throttling valve (TV3) 203g. According to an embodiment, the absorption temperature is maintained at 35° C. The absorber 203e forms a weak solution that is pumped by the pump 203f to the generator 203z in order to heat the liquid refrigerant. According to one embodiment, the efficiency of the system can be improved by using a solution heat exchanger 203a disposed between the generator 203z and the absorber 203e. The solution passing between the generator and the absorber can be a solution formed by a mixture of lithium-boride (LiBr) and water ($H_2O$), $NH_3$—$H_2O$ or the like. Thus, according to one embodiment, the ARC portion 203 of the cooling system 200 provides cooling temperatures in the range 10-18° C. It must be appreciated that since the ARC portion 203 employs LiBr—$H_2O$ solution, it may incur a potential crystallization problem of the LiBr at temperatures less than 4° C. Thus, to obtain a lower temperature range, for instance, the range from 0-5° C., the ERC portion of the cooling system is employed.

A portion of the steam output from the steam turbine 261 is used to drive the ERC portion 205 of the cooling system 200. The high pressure vapor (steam) (referred to herein as a primary fluid), flows through an ejector 205a, where it accelerates through a nozzle. The reduction in pressure that occurs upon passage through the nozzle induces vapor from the evaporator 205d (referred to herein as a secondary fluid). The primary and secondary fluids are mixed in a mixing chamber 205b. The mixed steam is cooled in a condenser 205c, whereafter the saturated liquid at the output of the condenser 205c is divided into two portions. The first portion is passed through throttling valve (TV2) 205e, which reduces the pressure of the fluid and is further passed to evaporator 205d. The evaporator 205d heats the fluid and forms the secondary fluid which is passed back to the ejector 205a. The second portion is delivered to the steam generator 253 via the water pump 262.

A portion of the steam output from the turbine 261 is used to drive the CRC portion of the cooling system 200 (FIG. 2B). Specifically, a portion of the steam is used to drive the compressors (Comp 1 and Comp 2), labelled as 207c and 207d respectively. The CRC portion 207 includes a high-temperature cycle 207A and a low-temperature cycle 207B respectively. According to one embodiment, nitrous oxide ($N_2O$) is used a refrigerant in the high-temperature and low-temperature cycles to provide cooling temperatures in the range (−50° C. to −80° C.).

In the low-temperature cycle 207B, super-heated nitrous oxide vapor is compressed in the compressor 207d and then cooled to a saturated liquid in the cascaded heat exchanger (CHX) 207h. The saturated liquid is further cooled in an internal heat exchanger (IHX2) 207i using a lower temperature fluid. Thereafter, the liquid is expanded in a throttling valve (TV5) 207j and passed to an evaporator 207k. The cooling in the CRC is achieved by the evaporation of the nitrous oxide in the evaporator 207k.

In the high-temperature cycle 207A, nitrous oxide is compressed in the compressor (COMP-1) 207c. The supercritical vapor is further cooled in a condenser 207e. Nitrous oxide vapor is again cooled by passing the vapor through an internal heat exchanger (IHX1) 207f. The nitrous oxide is expanded in throttling valve (TV4) 207g, and is followed by heating the nitrous oxide in the cascaded heat exchanger (CHX) 207h. In this manner, according to an embodiment, the high-temperature and low-temperature cycles of the CRC 207 provide for cooling in the range −50° C. to −80° C. Such low temperature ranges are essential for applications such as vaccine preservation or the like.

Figure 3:
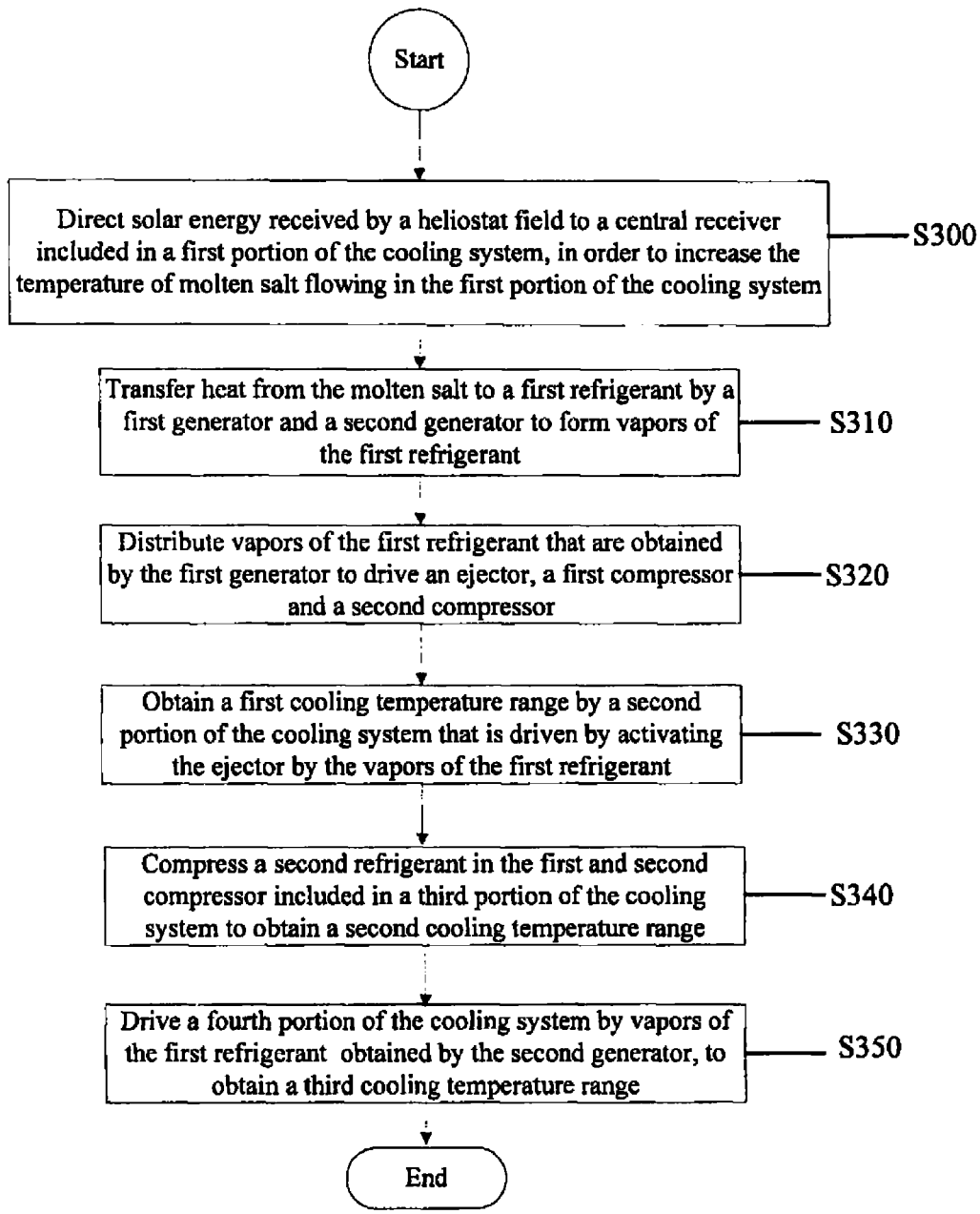
FIG. 3 depicts a flowchart illustrating the steps performed by the multi-mode cooling system.

FIG. 3 depicts according to one embodiment, a flowchart illustrating the steps performed by the multi-mode cooling system 200.

In step S300, the heliostat field receives solar energy and directs the solar energy to a central receiver that is included in a first portion of the cooling system. According to an embodiment, the first portion of the cooling system is a steam Rankine cycle (SRC) 250 that includes a central receiver that may be disposed on a tower. The heat absorbed by the central receiver from the heliostat field is used to heat molten salt that flows through pipes included in the central receiver. The heated molten salt is used as a heat transfer mechanism to deliver heat to refrigerants in the cooling system.

In step S310, the heated molten salt flows through steam generators (for instance, generators 253 and 203z as shown in FIG. 2) and transfers heat to a first refrigerant, for instance water, to generate water vapor (steam). According to an embodiment, water is used the working fluid for power generation in the SRC, and as a refrigerant in ARC and ERC portions of the cooling system.

In step S320, the steam obtained from the first generator is transferred to a steam turbine that distributes the steam to activate an ejector, a first compressor, and a second compressor.

The ejector operates in a second portion of the cooling system that is configured to obtain a first cooling temperature range, step S330. According to an embodiment, the second portion of the cooling system is an ejector-refrigeration-cycle (ERC) 205 as shown in FIG. 2. High velocity refrigerant vapors at the exit of the ejector's nozzle create a high vacuum at an inlet of a mixing chamber included in the second portion of the cooling system. The vacuum extracts secondary vapor from an evaporator (included in the second portion), thereby creating a cooling effect. The cooling temperature range obtained by the ERC is in the range from 0° C. to 5° C. and provisions for the cooling requirements for applications such as food preservation and the like.

In step S340, a portion of the steam (obtained by the first generator) is distributed by the steam turbine to first and second compressors that drive a third portion of the cooling system. According to one embodiment, the third portion of the cooling system includes a high-temperature cycle and a low-temperature cycle. The low-temperature cycle of the third portion of the cooling system includes a plurality of heat exchangers and an evaporator. Nitrous oxide is used as a refrigerant in the third portion of the cooling system. Nitrous oxide vapor is compressed in the first compressor and then cooled to a saturated liquid in a cascaded heat exchanger and an internal heat exchanger. Thereafter the liquid is expended by a throttling valve and passed to an evaporator. The cooling in this cycle is achieved by the evaporation of the nitrous oxide in the evaporator.

According to an embodiment, the high-temperature cycle of the third portion of the cooling system includes a condenser and a plurality of heat exchangers. Nitrous oxide (second refrigerant) is compressed in the second compressor and the nitrous oxide vapor is cooled in a condenser. Nitrous oxide vapor is further cooled by passing the vapor through an internal heat exchanger. The nitrous oxide is further expanded by a throttling valve heated in the heat exchanger (CHX) 207*h*. In this manner, according to an embodiment, the high-temperature and low-temperature cycles of the third portion of the cooling system provide for cooling in the range −50° C. to −80° C. Such low temperature ranges are essential for applications such as vaccine preservation or the like.

In step S350, a fourth portion of the cooling system is driven by vapors of the first refrigerant that are obtained by the second generator, in order to obtain a third cooling temperature range. According to an embodiment, the fourth portion of the cooling system is an absorption refrigeration cycle that includes a condenser, an evaporator, an absorber, and a solution heat exchanger. The pure water vapor (i.e., vapors of the first refrigerant) obtained from the second generator are cooled in the condenser-1 (C1) and passed through a throttling valve to generate saturated liquid at reduced pressure in the evaporator. Saturated vapor entering the absorber is mixed with a solution (for instance lithium-boride) that is eventually pumped to a solution heat exchanger and passed to the second generator to heat the first refrigerant (i.e., water which is used as a refrigerant in the ARC portion of the cooling system). Thus, the ARC portion of the cooling system achieves cooling temperatures in the range from 10° C. to 18° C. and provisions for the cooling requirements for applications such as air-conditioning and the like.

By the method as described above with reference to FIG. 3, the cooling system obtains different cooling temperature ranges using a single thermodynamic cycle. Thus, the cooling temperature requirements of different applications can be provisioned by a single solar powered cooling system as described above.

Figure 4:
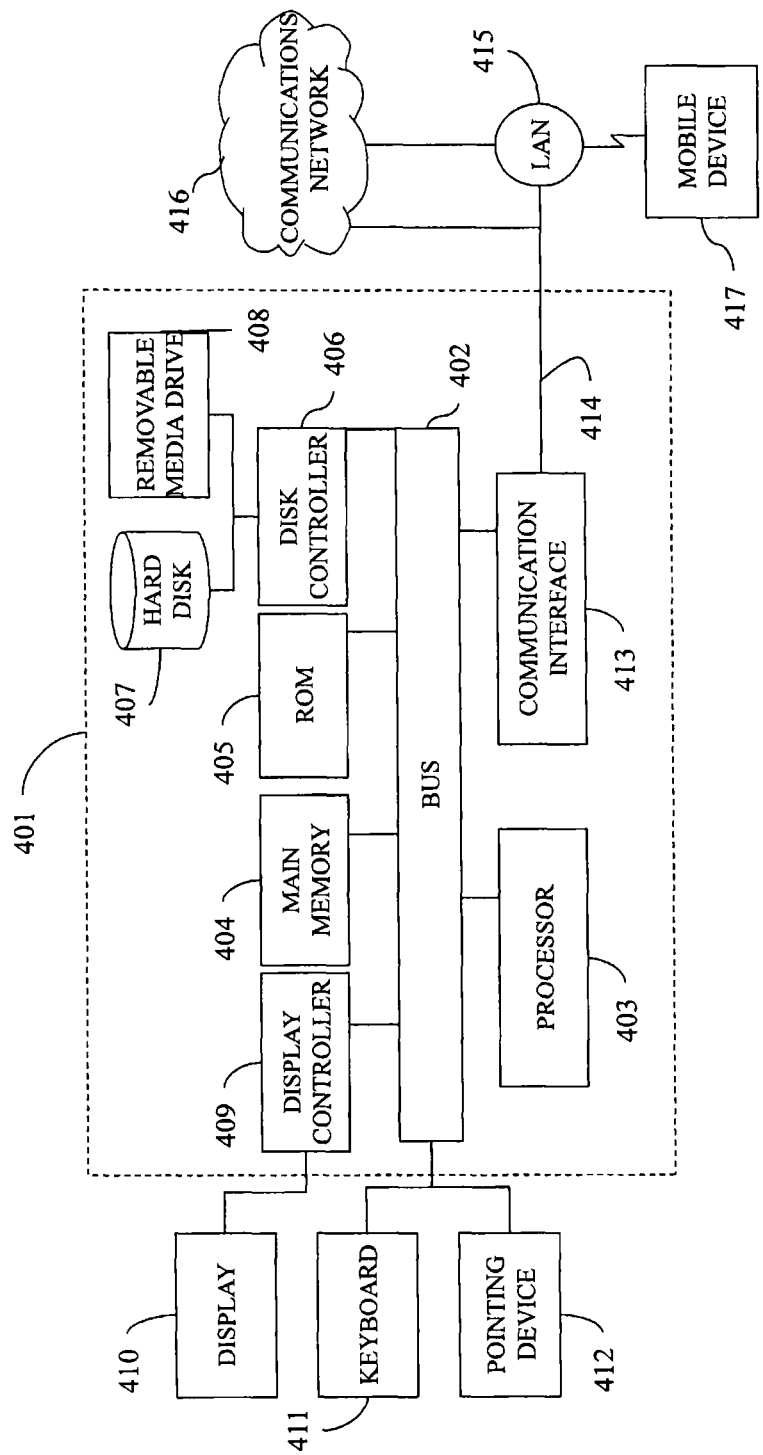
FIG. 4 illustrates a block diagram of a computing device according to an embodiment.

Each of the functions of the above described embodiments may be implemented by a control circuitry, which includes one or more processing circuits. A processing circuit includes a programmed processor, for example, processor 403, as shown in FIG. 4. A processing circuit also includes devices such as an application specific integrated circuit (ASIC) and conventional circuit components arranged to perform the recited functions. For instance, the throttling valves may be controlled by a processing circuit. Further, in order to achieve a desired temperature within a cooling temperature range, the valves may be controlled to determine a flow rate of the refrigerants through various portions of the cooling system. According to one embodiment, the cooling system may include flow sensors that are configured to detect the flow rate (of refrigerants) though a desired portion of the cooling system and report (via a wireless connection or hard wired connection) the detected flow rate to a processing circuit (for example, a computer). The computer may perform processing, for instance, with the help of lookup tables control the flow rate of the refrigerants to obtain a specific cooling temperature. Furthermore, the processing circuit may also be configured to control the positioning of the plurality of mirrors included in the helioststfield. Additionally, according to one embodiment, the processing circuit may be configured to compute the fraction of steam that is to be distributed by the steam turbine to drive the second portion and the third portion of the cooling system. Accordingly, the processing circuit may be configured to control valves in order to control the amount of steam that is to be dispersed to the respective portions of the cooling system. The distribution of steam may be based, for instance, on demand of a particular cooling temperature required at a certain time of the day or the like.

The various features discussed above may be implemented by a computer system (or programmable logic). FIG. 4 illustrates such a computer system 401. The computer system 401 includes a disk controller 406 coupled to the bus 402 to control one or more storage devices for storing information and instructions, such as a magnetic hard disk 407, and a removable media drive 408 (e.g., floppy disk drive, read-only compact disc drive, read/write compact disc drive, compact disc jukebox, tape drive, and removable magneto-optical drive). The storage devices may be added to the computer system 401 using an appropriate device interface (e.g., small computer system interface (SCSI), integrated device electronics (IDE), enhanced-IDE (E-IDE), direct memory access (DMA), or ultra-DMA).

The computer system 401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 401 may also include a display controller 409 coupled to the bus 402 to control a display 410, for displaying information to a computer user. The computer system includes input devices, such as a keyboard 411 and a pointing device 412, for interacting with a computer user and providing information to the processor 403. The pointing device 412, for example, may be a mouse, a trackball, a finger for a touch screen sensor, or a pointing stick for communicating direction information and command selections to the processor 403 and for controlling cursor movement on the display 410.

The processor 403 executes one or more sequences of one or more instructions contained in a memory, such as the main memory 404. Such instructions may be read into the main memory 404 from another computer readable medium, such as a hard disk 407 or a removable media drive 408. One or more processors in a multi-processing arrangement may also be employed to execute the sequences of instructions contained in main memory 404. In alternative embodiments, hard-wired circuitry may be used in place of or in combination with software instructions. Thus, embodiments are not limited to any specific combination of hardware circuitry and software.

As stated above, the computer system 401 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 401, for driving a device or devices for implementing the invention, and for enabling the computer system 401 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 403 for execution. A computer readable medium may take many forms, including but not limited to, non-volatile media or volatile media. Non-volatile media includes, for example, optical, magnetic disks, and magneto-optical disks, such as the hard disk 407 or the removable media drive 408. Volatile media includes dynamic memory, such as the main memory 404. Transmission media, on the contrary, includes coaxial cables, copper wire and fiber optics, including the wires that make up the bus 402. Transmission media also may also take the form of acoustic or light waves, such as those generated during radio wave and infrared data communications.

Various forms of computer readable media may be involved in carrying out one or more sequences of one or more instructions to processor 403 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 401 may receive the data on the telephone line and place the data on the bus 402. The bus 402 carries the data to the main memory 404, from which the processor 403 retrieves and executes the instructions. The instructions received by the main memory 404 may optionally be stored on storage device 407 or 408 either before or after execution by processor 403.

The computer system 401 also includes a communication interface 413 coupled to the bus 402. The communication interface 413 provides a two-way data communication coupling to a network link 414 that is connected to, for example, a local area network (LAN) 415, or to another communications network 416 such as the Internet. For example, the communication interface 413 may be a network interface card to attach to any packet switched LAN. As another example, the communication interface 413 may be an integrated services digital network (ISDN) card. Wireless links may also be implemented. In any such implementation, the communication interface 413 sends and receives electrical, electromagnetic or optical signals that carry digital data streams representing various types of information.

The network link 414 typically provides data communication through one or more networks to other data devices. For example, the network link 414 may provide a connection to another computer through a local network 415 (e.g., a LAN) or through equipment operated by a service provider, which provides communication services through a communications network 416. The local network 414 and the communications network 416 use, for example, electrical, electromagnetic, or optical signals that carry digital data streams, and the associated physical layer (e.g., CAT 5 cable, coaxial cable, optical fiber, etc.). The signals through the various networks and the signals on the network link 414 and through the communication interface 413, which carry the digital data to and from the computer system 401 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 401 can transmit and receive data, including program code, through the network(s) 415 and 416, the network link 414 and the communication interface 413. Moreover, the network link 414 may provide a connection through a LAN 415 to a mobile device 417 such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of simultaneously obtaining a plurality of cooling-temperature ranges by a solar powered cooling system, the method comprising:
    directing, by a heliostat field, solar energy to a receiver included in a first portion of the cooling system, the receiver heating molten-salt that flows in the first portion of the cooling system;
    transferring heat energy from the heated molten salt to a first refrigerant, in a first generator and a second generator, the transferred heat energy forming vapors of the first refrigerant;
    distributing, by a steam turbine, vapors of the first refrigerant obtained by the first generator, to drive a second portion and a third portion of the cooling system;
    driving an ejector nozzle included in the second portion of the cooling system by the vapors of the first refrigerant to obtain a first cooling temperature range;
    compressing a second refrigerant, by a first compressor and a second compressor included in a third portion of the cooling system to obtain a second cooling temperature range; and
    condensing, by a condenser included in a fourth portion of the cooling system, vapors of the first refrigerant obtained by the second generator, to obtain a third cooling temperature range.

2. The method of claim 1, wherein the first portion of the cooling system is a steam Rankine cycle, the second portion of the cooling system is an ejector refrigeration cycle, the third portion of the cooling system is a cascaded refrigeration cycle, and the fourth portion of the cooling system is an absorption refrigeration cycle.

3. The method of claim 1, wherein the first cooling temperature range is from 0° C. to 5° C., the second cooling temperature range is from −50° C. to −80° C., and the third cooling temperature range is from 10° C. to 18° C.

4. The method of claim 1, wherein the first refrigerant is water ($H_2O$) and the second refrigerant is nitrous oxide ($N_2O$).

5. The method of claim 1, wherein the molten salt is selected from a group consisting of lithium fluoride (LiF), sodium chloride (NaCl), sodium tetra-fluoroborate ($NaBF_4$), a mixture of NaCl and potassium chloride (KCl), a mixture of lithium fluoride (LiF) and Beryllium fluoride (LiF—$BeF_2$), a mixture of LiF, sodium fluoride (NaF), and potassium fluoride (KF) and a mixture of potassium chloride and magnesium chloride.

6. The method of claim 1, further comprising:
detecting via flow sensors, a flow rate of the first refrigerant and the second refrigerant in the first portion, second portion, third portion and the fourth portion of the cooling system, respectively; and
transmitting, the detected flow rates to circuitry that is configured to control the flow rates of the first refrigerant and the second refrigerant.

7. The solar powered cooling system of claim 1, wherein the molten salt is selected from a group consisting of lithium fluoride (LiF), sodium chloride (NaCl), sodium tetra-fluoroborate ($NaBF_4$), a mixture of NaCl and potassium chloride (KCl), a mixture of lithium fluoride (LiF) and Beryllium fluoride (LiF—$BeF_2$), a mixture of LiF, sodium fluoride (NaF), and potassium fluoride (KF) and a mixture of potassium chloride and magnesium chloride.

8. The non-transitory computer readable of claim 1, wherein the molten salt is selected from a group consisting of lithium fluoride (LiF), sodium chloride (NaCl), sodium tetra-fluoroborate ($NaBF_4$), a mixture of NaCl and potassium chloride (KCl), a mixture of lithium fluoride (LiF) and Beryllium fluoride (LiF—$BeF_2$), a mixture of LiF, sodium fluoride (NaF), and potassium fluoride (KF) and a mixture of potassium chloride and magnesium chloride.

9. A solar powered cooling system comprising:
a heliostat field configured to direct received solar energy to a receiver included in a first portion of the cooling system, the receiver heating molten-salt that flows in the first portion of the cooling system;
a first steam-generator and a second steam generator configured to form vapors of a first refrigerant by transferring heat energy from the molten-salt to the first refrigerant;
a steam turbine configured to distribute vapors of the first refrigerant obtained by the first steam-generator, to drive a second portion and a third portion of the cooling system;
an ejector nozzle included in the second portion of the cooling system, and driven by vapors of the first refrigerant, being configured to obtain a first cooling-temperature range;
a first compressor and a second compressor included in a third portion of the cooling system and configured to compress a second refrigerant to obtain a second cooling-temperature range; and
a condenser included in a fourth portion of the cooling system and configured to condense vapors of the first refrigerant obtained by the second generator, to obtain a third cooling temperature range.

10. The solar powered cooling system of claim 9, wherein the first portion of the cooling system is a steam Rankine cycle, the second portion of the cooling system is an ejector refrigeration cycle, the third portion of the cooling system is a cascaded refrigeration cycle, and the fourth portion of the cooling system is an absorption refrigeration cycle.

11. The solar powered cooling system of claim 9, wherein the first cooling temperature range is from 0° C. to 5° C., the second cooling temperature range is from −50° C. to −80° C., and the third cooling temperature range is from 10° C. to 18° C.

12. The solar powered cooling system of claim 9, wherein the first refrigerant is water ($H_2O$) and the second refrigerant is nitrous oxide ($N_2O$).

13. The solar powered cooling system of claim 9, further comprising:
flow sensors configured to
detect a flow rate of the first refrigerant and the second refrigerant in the first portion, second portion, third portion and the fourth portion of the cooling system, respectively; and
transmit, the detected flow rates to circuitry that is configured to control the flow rates of the first refrigerant and the second refrigerant.

14. A non-transitory computer readable medium having stored thereon a program that when executed by a computer causes the computer to execute a method of simultaneously obtaining a plurality of cooling-temperature ranges by a solar powered cooling system, the method comprising:
directing, by a heliostat field, solar energy to a receiver included in a first portion of the cooling system, the receiver heating molten-salt that flows in the first portion of the cooling system;
transferring heat energy from the heated molten salt to a first refrigerant, in a first generator and a second generator, the transferred heat energy forming vapors of the first refrigerant;
distributing, by a steam turbine, vapors of the first refrigerant obtained by the first generator, to drive a second portion and a third portion of the cooling system;
driving an ejector nozzle included in the second portion of the cooling system by the vapors of the first refrigerant to obtain a first cooling temperature range;
compressing a second refrigerant, by a first compressor and a second compressor included in a third portion of the cooling system to obtain a second cooling temperature range; and
condensing, by a condenser included in a fourth portion of the cooling system, vapors of the first refrigerant obtained by the second generator, to obtain a third cooling temperature range.

15. The non-transitory computer readable of claim 14, wherein the first portion of the cooling system is a steam Rankine cycle, the second portion of the cooling system is an ejector refrigeration cycle, the third portion of the cooling system is a cascaded refrigeration cycle, and the fourth portion of the cooling system is an absorption refrigeration cycle.

16. The non-transitory computer readable of claim 14, wherein the first cooling temperature range is from 0° C. to 5° C., the second cooling temperature range is from −50° C. to −80° C., and the third cooling temperature range is from 10° C. to 18° C.

17. The non-transitory computer readable of claim 14, wherein the first refrigerant is water ($H_2O$) and the second refrigerant is nitrous oxide ($N_2O$).

18. The non-transitory computer readable of claim 14, the method further comprising:
detecting via flow sensors, a flow rate of the first refrigerant and the second refrigerant in the first portion, second portion, third portion and the fourth portion of the cooling system, respectively; and receiving the detected flow rates to control the flow rates of the first refrigerant and the second refrigerant.

* * * * *